No. 612,129. Patented Oct. 11, 1898.
V. E. DOREMUS.
BACK PEDALING BRAKE.
(Application filed Mar. 19, 1897.)
(No Model.)
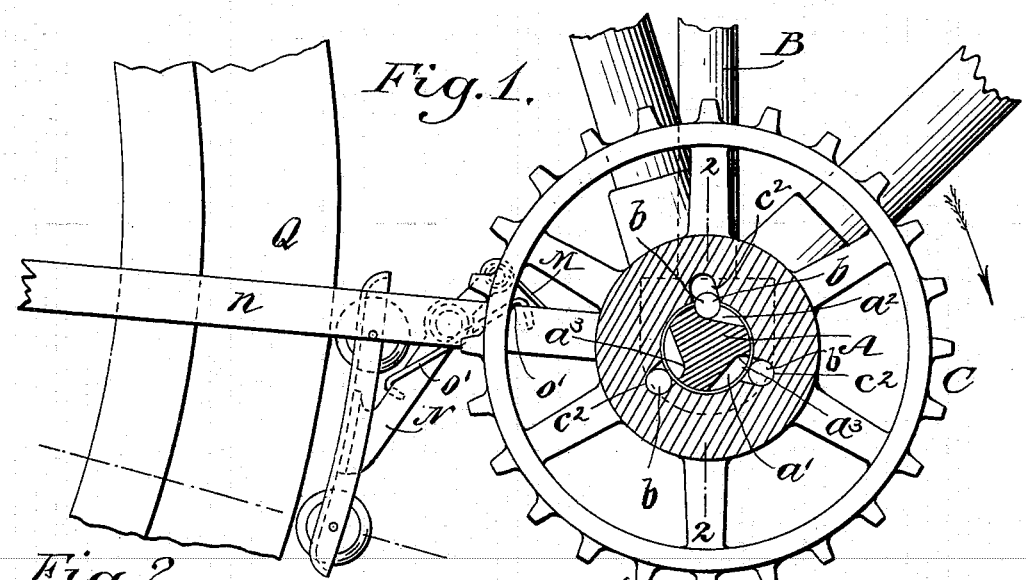
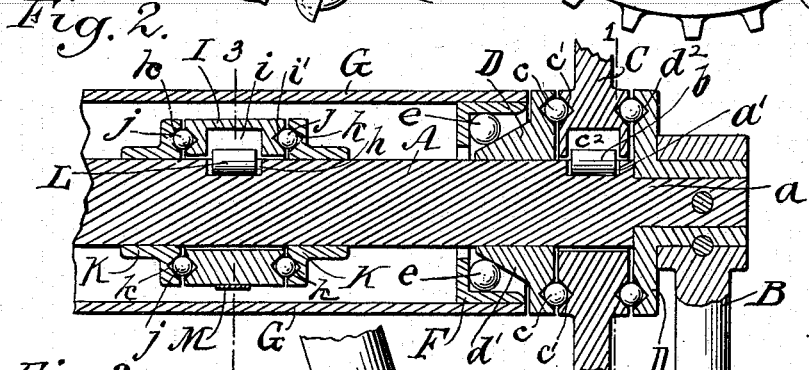
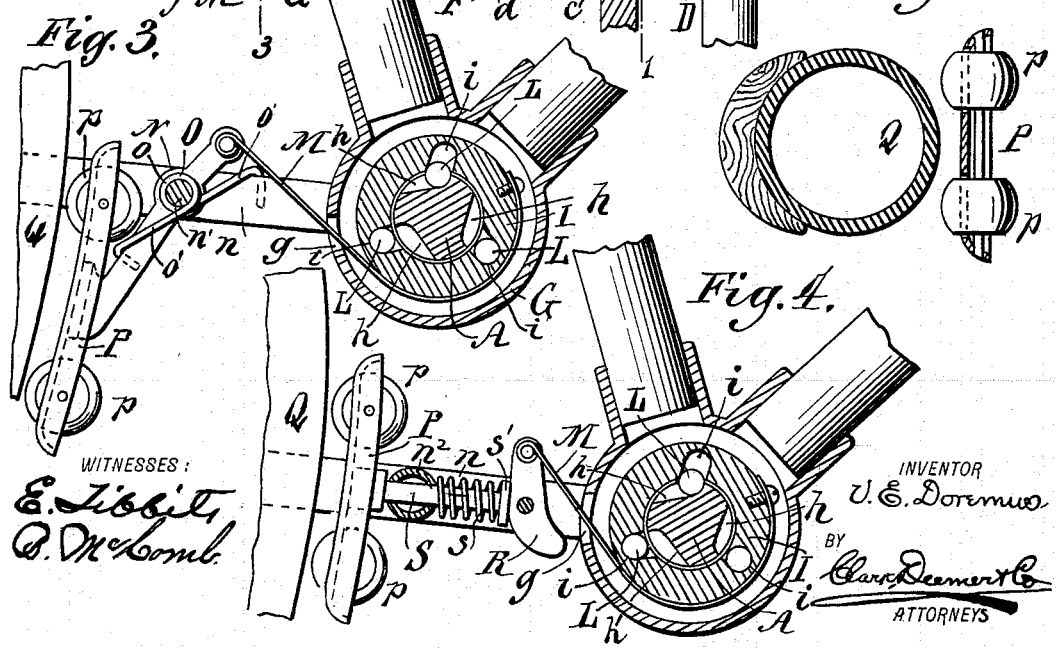
WITNESSES:
INVENTOR
V. E. Doremus
BY
Clark Deemer & Co.
ATTORNEYS
THE NORRIS PETERS CO., PHOTO-LITHO., WASHINGTON, D. C.

UNITED STATES PATENT OFFICE.

VICTOR E. DOREMUS, OF NEW YORK, N. Y., ASSIGNOR OF ONE-HALF TO PATRICK T. WALL, OF SAME PLACE.

BACK-PEDALING BRAKE.

SPECIFICATION forming part of Letters Patent No. 612,129, dated October 11, 1898.

Application filed March 19, 1897. Serial No. 628,292. (No model.)

*To all whom it may concern:*

Be it known that I, VICTOR E. DOREMUS, a citizen of the United States, and a resident of New York, (Brooklyn,) county of Kings, and State of New York, have invented certain new and useful Improvements in Driving-Gear and Brake Mechanism, of which the following is a specification, reference being had to the accompanying drawings, forming a part thereof, in which similar letters of reference indicate corresponding parts.

This invention relates to certain improvements in the driving-gear and brake mechanism of bicycles or other similar vehicles.

The object of my improvements is to provide a simple, positively-acting, and effective mechanism whereby the driving-gear may be readily released from the pedal-shaft, so that the pedals can be used as a rest while "coasting" or when desired, and a mechanism adapted to be operated by a "back-pedaling" movement to apply a brake to the wheel of the machine when desired.

To these ends my invention embodies certain improvements in a driving-gear and brake mechanism of this character whereby a more positive and effective operation will be secured, substantially as hereinafter fully set forth.

In the drawings, Figure 1 is a side elevation illustrating my improvements and the adjusted portions of a bicycle, the hub portion of the main sprocket or driving gear being shown in vertical section taken on the line 1 1, Fig. 2. Fig. 2 is a detail vertical sectional view, taken transversely with relation to the crank-shaft, on the line 2 2, Fig. 1. Fig. 3 is a vertical transverse sectional view illustrating the brake mechanism, taken on the line 3 3, Fig. 2. Fig. 4 is a corresponding view showing a modified form of brake mechanism proper. Fig. 5 is a sectional view illustrating the relation of the friction-wheels of the brake-shoe to the tire.

Referring to the drawings, A designates the pedal-shaft, carrying the pedal-cranks B in the ordinary manner. The extended end $a$ of the shaft is provided with a circumferential series of pockets or recesses $a'$ in its periphery. These pockets may be three in number, as shown, and embody an inclined bottom $a^2$, terminating in a rounded or concaved socket end $a^3$, adapted to receive a part section of cylindrical metallic rollers $b$, respectively operating and sliding with relation to each pocket.

The driving-gear or sprocket-wheel C is loosely mounted upon the recessed or socketed portion of the shaft, preferably by means of ball-bearings $c$, arranged with respect to annular grooves $c'$ in the outer faces of the hub of the sprocket-wheel, and corresponding annular grooves $d$ in the inner faces of flanges or boxes D, secured upon the pedal-shaft. (See Fig. 2.)

The inner boxing D is preferably provided with a conical projecting portion $d'$, forming a bearing-surface for ball-bearings $e$, retained in a flange or boxing F, mounted within a tubular fixed casing G, surrounding the pedal-shaft, which ball-bearing mechanism forms the mounting for the pedal-shaft.

In the hub of the driving-gear or sprocket-wheel is provided a series of recesses or pockets $c^2$, which open from the central bearing-eye or opening and are preferably of approximately U shape in cross-section. These pockets $c^2$ correspond in number to the pockets or recesses $a'$ in the pedal-shaft and correspond to the cylindrical sliding rollers $b$, so that the latter are adapted to drop within and be received and contained by the pockets in the hub of the driving-wheel C.

Upon the central portion of the pedal-shaft, intermediately of its ends, is provided a peripheral series of pockets or recesses $h$, corresponding in shape to the pockets $a'$, but extended in an opposite direction, and surrounding said pocketed portion of the shaft is loosely mounted a hub I, of similar construction to the hub of the driving-gear or sprocket-wheel and having corresponding pockets or recesses $i$, which register with the pockets or recesses $h$. The hub I is similarly carried upon ball-bearings $j$, operating with respect to annular grooves $i'$ in the hub and corresponding grooves $k$ in flanges or boxing K, secured upon the pedal-shaft.

In the centrally-arranged mechanism just described is comprised a series of cylindrical rollers L, corresponding to the rollers $b$, and said mechanism in its entirety corresponds in its general construction and arrangement to the similar mechanism forming the connection between the driving-gear or sprocket-wheel and the end of the crank-shaft, as will be seen by reference to Figs. 1, 2, and 3.

The boxing or collar I carries a band or strap M, extending outwardly through an opening or slot $g$ in the rear wall of the shaft-casing G to the upper end of a lever N, mounted upon a spindle $n$, secured to a portion $n'$ of the bicycle-frame and retained in normal position by a coiled spring O, having a central portion $o$, surrounding the shaft or bearing-pin $n'$ of said lever, and divergent arms or end portions $o'$ $o'$, respectively engaged with the frame member $n$ and with the lower end of the lever. Upon the lower end of the lever N is carried a brake-shoe P, at the top and bottom portions of which are journaled friction-rollers $p$, arranged in pairs in parallel position and projecting from the face of the carrying-shoe, the relative arrangement of said friction-rollers being such that they bear at two sides of the periphery of the cylindrical tire Q, as shown in Fig. 5. These friction-rollers operate in their contact with the wheel-tire to avoid any sudden jar occasioned by the quick application of the brake.

It will be understood that the driving-gear or sprocket-wheel C is connected by chain or sprocket or in any other suitable manner with the driving-gear carried upon the main traction-wheel of the bicycle.

In Fig. 4 I have illustrated a modified construction of the brake mechanism proper, in which the connecting band or strap M, extending from the periphery of the hub or collar I, is connected with a cam-lever R, pivoted upon the frame portion $n$ and adapted to bear against a plunger-rod S, sliding in the frame member $n^2$ and carrying the brake-shoe P, as shown in Fig. 4. In this modified construction the brake-shoe is returned to normal position by means of a coiled spring $s$, arranged to surround the plunger S and having its ends bearing respectively upon the frame member $n^2$ and the head $s'$ at the end of the plunger, against which the cam-lever bears.

The operation and advantages of my invention will be readily understood.

Rotary motion is applied to the sprocket-wheel C in the direction of the arrow shown in Fig. 1 by the ordinary operation of the pedal-shaft in a forward direction by reason of the fact that the sliding rollers $b$ drop from their containing-recess $c^2$ in the hub of the sprocket-wheel into the concaved end portion of the pockets $a'$ in the pedal-shaft, so that they become jammed between the ends of said pedal-shaft pockets and the end of the hub recesses, as shown in Fig. 1. This operation establishes a secure and effective connection between the hub of the sprocket-wheel and the pedal-shaft at all times when the latter is rotated in a forward direction. In the relative construction and arrangement by which this connection is established it will be noted that the sliding rollers are partly contained within the hub recesses $c^2$ and within the pedal-shaft pockets when the locking connection is formed, a little more than half the diameter of the rollers being within the pedal-shaft pocket. This improved construction and arrangement insures a positive and secure connection which cannot be dislodged or become accidentally broken. During this forward rotation of the pedal-shaft and the consequent communication of driving power to the main traction-wheel of the bicycle through the medium of the main sprocket-wheel and its connecting mechanism the hub or collar I remains in a stationary position by reason of the fact that its recesses or pockets and the coöperating pockets $h$ upon the pedal-shaft are reversely arranged with respect to the recesses or pockets $c^2$ and $a'$ at the sprocket-wheel connection. The rollers L are thus revolved by action of the inclined bottom of the pedal-shaft pockets and are carried into their respective recesses $i$ in the hub or collar I without forming a locking connection by which motion is communicated to the hub or collar.

To release the sprocket-wheel from engagement with the pedal-shaft when coasting or when desired it is only necessary to force the pedals in a backward direction, which causes a corresponding rearward movement of the pedal-shaft, so that the inclined bottom $a^2$ of the pedal-shaft pockets $a'$ will operate to roll the rollers $b$ into the hub-recesses of the sprocket-wheel, and thus break the connection between the sprocket-wheel and pedal-shaft. When the pedal-shaft is retained in this position, it will operate to retain the rollers $b$ in their respective hub-recesses in the sprocket-wheel. This permits the continued revolution of the sprocket-wheel in a forward direction upon its ball-bearings $c$ without any liability of engagement or connection with the pedal-shaft.

If it is desired to apply the brake, back-pedaling will rotate the pedal-shaft in a rearward direction, during which its disconnection from the sprocket-wheel is maintained, but by which the rollers L are thrown into locking connection, so that the rearward movement of the pedal-shaft is effectively communicated to the hub or collar I, and thus causes the rotation of the latter until the band or strap M is wound upon its periphery to a point which will throw the brake mechanism into active connection with the wheel-tire.

Whenever it is desired to operate the machine in a normal forward direction by the driving power of the pedal-shaft, it is only necessary to move the pedals forwardly, when the forward turn of the pedal-shaft will cause an instantaneous and secure locking of the same in connection with the sprocket-wheel by the action of the rollers $b$.

Having thus described my invention, what I claim as new, and desire to secure by Letters Patent, is—

1. An improved brake and coasting device for bicycles, comprising the pedal-shaft having two sets of oppositely-arranged peripheral pockets or recesses, a driving-gear or sprocket-wheel mounted upon suitable ball-bearings upon either face, and having pockets or recesses in its hub opening with respect to one of the sets of pockets in the shaft, a hub or collar loosely mounted upon the shaft and having pockets or recesses opening with respect to the other oppositely-arranged series of pockets in the shaft, a brake mechanism consisting of a double-roller brake-shoe, a spring-actuated brake-lever connected therewith, said lever being fulcrumed between the rear forks and carried by the same, a flexible strap, one end of which is connected with the free end of said lever, said strap extending through a suitable hole in the crank-hanger, its opposite end being secured to said collar, and rollers operating in said respective relatively-opening pockets of the oppositely-arranged series, whereby the driving-gear is automatically locked in connection with the pedal-shaft only during the forward rotation of the latter, and the brake-operating hub or collar is locked in connection with the pedal-shaft, only during a rearward movement of the latter, substantially as and for the purpose set forth.

2. An improved braking and coasting device for bicycles, comprising the pedal-shaft having two sets of oppositely-arranged peripheral pockets or recesses, a driving-gear or sprocket-wheel mounted upon suitable ball-bearings upon either face and having pockets or recesses in its hub opening with respect to one of the sets of pockets in the shaft, a hub or collar loosely mounted upon the shaft, and having pockets or recesses opening with respect to the other oppositely-arranged series of pockets in the shaft, a series of rollers operating in said respective relatively-opening pockets of the oppositely-arranged series, whereby the driving-gear is automatically locked in connection with the pedal-shaft only during the forward rotation of the latter, and the brake-operating hub or collar is locked in connection with the pedal-shaft only during a rearward movement of the latter, and a brake mechanism consisting of a double-roller brake-shoe, a spring-actuated brake-rod fixed thereto, said rod being adapted to slide through a suitable hole in the cross-brace of the rear stays, a cam-lever pivoted between said rear stays, and adapted to operate said brake-rod, and a flexible strap one end of which is connected with the free end of said lever, said strap extending through a suitable hole in the crank-hanger, its opposite end being secured to said collar, substantially as and for the purpose set forth.

In testimony that I claim the foregoing as my invention I have signed my name, in presence of two witnesses, this 16th day of March, 1897.

VICTOR E. DOREMUS.

Witnesses:
C. SEDGWICK,
E. TIBBITS.